United States Patent [19]

Kim et al.

[11] Patent Number: 6,008,730
[45] Date of Patent: Dec. 28, 1999

[54] SOUND WARNING CIRCUIT FOR PCI HOT PLUG

[75] Inventors: Hyung-Sun Kim; In-Ho Lee; Seung-Wha Yoo, all of Seoul, Rep. of Korea

[73] Assignee: SamSung Electronics Co., Ltd., Suwon, Rep. of Korea

[21] Appl. No.: 09/110,188

[22] Filed: Jul. 6, 1998

[30] Foreign Application Priority Data

Jul. 31, 1997 [KR] Rep. of Korea ...................... 97/36516

[51] Int. Cl.⁶ .................................................. G08B 21/00
[52] U.S. Cl. ...................... 340/635; 340/650; 340/651; 361/752; 361/753; 395/280; 395/283
[58] Field of Search ........................... 340/384.71, 384.7, 340/650, 651, 652, 653, 654, 635; 361/752, 753; 395/280, 282, 283, 555, 556, 559

[56] References Cited

U.S. PATENT DOCUMENTS

| | | | |
|---|---|---|---|
| 5,426,740 | 6/1995 | Bennett | 395/325 |
| 5,446,869 | 8/1995 | Padgett et al. | 395/500 |
| 5,455,915 | 10/1995 | Coke | 395/325 |
| 5,502,824 | 3/1996 | Heil | 395/293 |
| 5,533,204 | 7/1996 | Tipley | 395/288 |
| 5,649,162 | 7/1997 | Klein et al. | 395/500 |
| 5,689,660 | 11/1997 | Johnson et al. | 395/309 |
| 5,701,483 | 12/1997 | Pun | 395/681 |
| 5,712,754 | 1/1998 | Sides et al. | 361/58 |
| 5,732,226 | 3/1998 | Wszolek et al. | 395/287 |
| 5,734,847 | 3/1998 | Garbus et al. | 395/308 |
| 5,737,544 | 4/1998 | Wszolek | 395/287 |
| 5,740,376 | 4/1998 | Carson et al. | 395/281 |
| 5,754,114 | 5/1998 | Gnadt | 340/649 |
| 5,793,987 | 8/1998 | Quackenbush et al. | 395/280 |
| 5,821,868 | 10/1998 | Kuhling | 340/649 |
| 5,898,844 | 4/1999 | Thompson | 395/283 |

*Primary Examiner*—Daniel J. Wu
*Assistant Examiner*—Toan N. Pham
*Attorney, Agent, or Firm*—Robert E. Bushnell, Esq.

[57] ABSTRACT

A sound warning circuit for PCI hot plug basically comprises: a timer that takes as inputs a fixed frequency clock and the system port B's bit 0, and which controls the system; a logic AND gate that takes as inputs the timer output and the system port B's bit 1; a speaker driver that takes as an input the AND gate's output; and a speaker that operates based on the speaker driver. In a further embodiment, the timer takes as inputs a fixed frequency clock and either the system port B's bit 0 or a PCI card VDD input, while the AND gate takes as inputs the timer output and any one or more of the system port B's bit 1, a chassis ground cable 0 input, and a chassis ground cable 1 input. In a further embodiment, the AND gate takes as inputs the timer output and either the system port B's bit 1 input or the output of a D Flip-Flop, the latter having the chassis ground cable signal as an input and receiving a reset signal from an AND gate, the latter having as inputs a reset switch input and a system reset # input.

21 Claims, 8 Drawing Sheets

SOUND WARNING CIRCUIT FOR PCI HOT PLUG

CLAIM OF PRIORITY

This application makes reference to, incorporates the same herein, and claims all benefits accruing under 35 U.S.C. §119 from an application for A SOUND WARNING CIRCUIT FOR PCI HOT PLUG earlier filed in the Korean Industrial Property Office on the of Jul. $31^{st}$ 1997 and there duly assigned Ser. No. 36516/1997.

BACKGROUND OF THE INVENTION

1. Technical Field

This invention relates to a sound warning circuit for a Peripheral Components Interconnects (PCI) hot plug. In particular, in the circuit, the speaker warns the user when the user mistakenly accesses another adapter card while executing the PCI hot plug.

2. Related Art

The PCI hot plug system manages the adapter card in the PCI slot that controls the computer's auxiliary equipment. Researched by numerous companies, the PCI system can renew the adapter card to a new version while the system is operating and, when damage to the adapter card is discovered, can change to a new adapter card.

The user gives a command to use the computer's system port B. After the system creates the environment for PCI hot plug, it exchanges the adapter card.

Even when the entire system crashes because another, unprepared adapter card is accessed mistakenly by a user, a method to sense this has not been developed to the present day.

In addition, a PCI hot plug is possible only when power to the input/output board and to the PCI card is off. Therefore, there is a need for the development of a method to determine whether the applicable card's power is off when the PCI hot plug is readied according to the system's command.

The following patents are considered to be representative of the prior art, and are burdened by the disadvantages set forth herein: U.S. Pat. No. 5,712,754 to Sides et al., entitled Hot Plug Protection System, U.S. Pat. No. 5,649,162 to Klein et al., entitled local Bus Interface, U.S. Pat. No. 5,701,483 to Pun, entitled Data Access Implementation Of Device Driver Interface, U.S. Pat. No. 5,689,660 to Johnson et al., entitled Enhanced Peripheral Component Interconnect Bus Protocol, U.S. Pat. No. 5,533,204 to Tipley, entitled Split Transaction Protocol For The Peripheral Component Interconnect Bus, U.S. Pat. No. 5,502,824 to Heil, entitled Peripheral Component Interconnect "Always On" Protocol, U.S. Pat. No. 5,455,915 to Coke, entitled Computer System With Bridge Circuitry Having Input/Output Multiplexers And Third Direct Unidirectional Path For Data Transfer Between Buses Operating At Different Rates, U.S. Pat. No. 5,446,869 to Padgett et al., entitled Configuration And RAM/ROM Control Of PCI Extension Card Residing On MCA Adapter Card, U.S. Pat. No. 5,426,740 to Bennett, entitled Signaling Protocol For Concurrent Bus Access In A Multiprocessor System, U.S. Pat. No. 5,740,376 to Carson et al., entitled Signaling Protocol For A Peripheral Component Interconnect, U.S. Pat. No. 5,737,544 to Wszolek, entitled Link System Controller Interface Linking A PCI Bus To Multiple Other Buses, U.S. Pat. No. 5,734,847 to Garbus et al., entitled Method And Apparatus For Enabling Intelligent I/O Subsystems Using PCI I/O Devices, and U.S. Pat. No. 5,732,226 to Wszolek et al., entitled Apparatus For Granting Either A CPU Data Bus Or A Memory Data Bus Or A Memory Data Bus Access To A PCI Bus.

SUMMARY OF THE INVENTION

An object of the invention is to provide a sound warning circuit for a PCI hot plug. The invention has been devised to solve the above problems. If the PCI hot plug accesses an unprepared adapter card, the speaker sounds a warning to the user to prevent further PCI hot plug execution.

To achieve the above object, according to the invention, there is provided a sound warning circuit for the PCI hot plug comprising: a timer that takes as inputs the fixed frequency clock and the system port B's bit 0, which control the system; a logic AND gate that takes as inputs the timer's output and said system port B's bit 1; a speaker driver that takes as an input the AND gate's output; and a speaker that operates based on the speaker driver.

To achieve another object, according to another embodiment of the invention, there is provided a sound warning circuit for the PCI hot plug comprising: a logic OR gate that takes as inputs system port B's bit 0 and the PCI card's VDD; a timer that divides the fixed frequency clock's input by the OR gate's output; a logic OR gate that takes as inputs the system port B's bit 1 and chassis ground cables that become 1 when a PCI card in the power on state among the many PCI cards is separated from the system; a logic AND gate that takes as inputs the timer's output and the OR gate's output; a speaker driver that takes as input the AND gates's output; and a speaker that operates based on the speaker driver.

In a further embodiment of the invention, the sound warning circuit for the PCI hot plug comprises a logic OR gate that takes as inputs the system port B's bit 0 and the PCI card's VDD; a timer that divides the fixed frequency clock input by the OR gate output; a logic OR gate that takes as inputs the system port B's bit 0 and the PCI card's VDD; a timer that divides the fixed frequency clock input by the OR gate output; a logic OR gate that takes as inputs the system port B's bit 1 and the output of a D flip-flop which is connected to the chassis ground cable, and which is also connected to a reset arrangement; a reset arrangement including an AND gate having as inputs a system reset input and the output of a reset switch; a logic AND gate that takes as inputs the timer output and the output of the OR gate connected to the D flip-flop; a speaker driver that takes as an input the AND gate output; and a speaker that operates based on the speaker driver.

In further embodiments, discussed in more detail below, the timer is excluded so that the output of the OR gate (which receives the system port B's bit 0 and the PCI card's VDD input) is connected directly to an AND gate, the other input of which is connected to an OR gate (which receives the system port B's bit 1 and the chassis ground cable input, the output of the AND gate being connected directly to the speaker or audio device). As a further modification, the chassis ground cable input to the aforementioned OR gate can be replaced by an input from a D flip-flop, the latter having the chassis ground cable as an input and the output of a reset arrangement as a reset input.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

Figure 1:
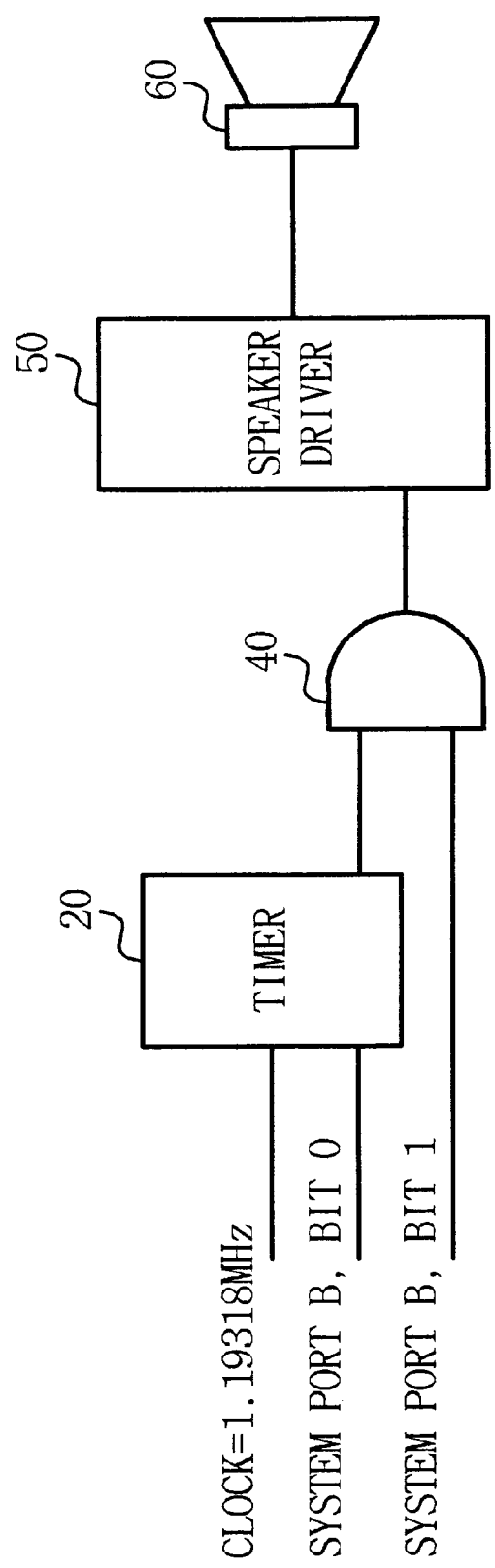
FIG. 1 is a preferred embodiment of the sound warning circuit for the PCI hot plug based on the invention.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alternatives falling within the spirit and scope of the invention as defined by the appended claims.

DESCRIPTION OF THE PREFERRED EMBODIMENTS

FIG. 1 is a preferred embodiment of a sound warning circuit for a PCI hot plug based on the present invention. As seen in FIG. 1, the sound warning circuit comprises a timer 20 which receives as inputs a clock signal and the system port B's bit 0 input. The output of timer 20 is connected to an input of AND gate 40, the other input of which receives the system port B's bit 1. The output of AND gate 40 is provided as an input to speaker driver 50, the output of which drives the speaker 60.

In this embodiment, when the system port B's bit 0 (input/output address is 0061h) is set to '1' by the user's command, the timer 20 starts dividing the clock by user programmed number n, resulting in a signal with 1.19318/n MHZ frequency. Furthermore, when the system port B's bit 1 (input/output address is 0061h) is set to '1' by the user's command, the 1.19318/n MHz signal goes through the logic AND gate 40 to the speaker driver 50 where it is amplified and is played through the speaker 60. The produced sound can be changed to a high or low frequency sound, depending on its use, by the user changing the timer's n, The sound warning circuit for the PCI hot plug, constructed as described above, can interface with the system using a PCI card, as now described.

Figure 2:
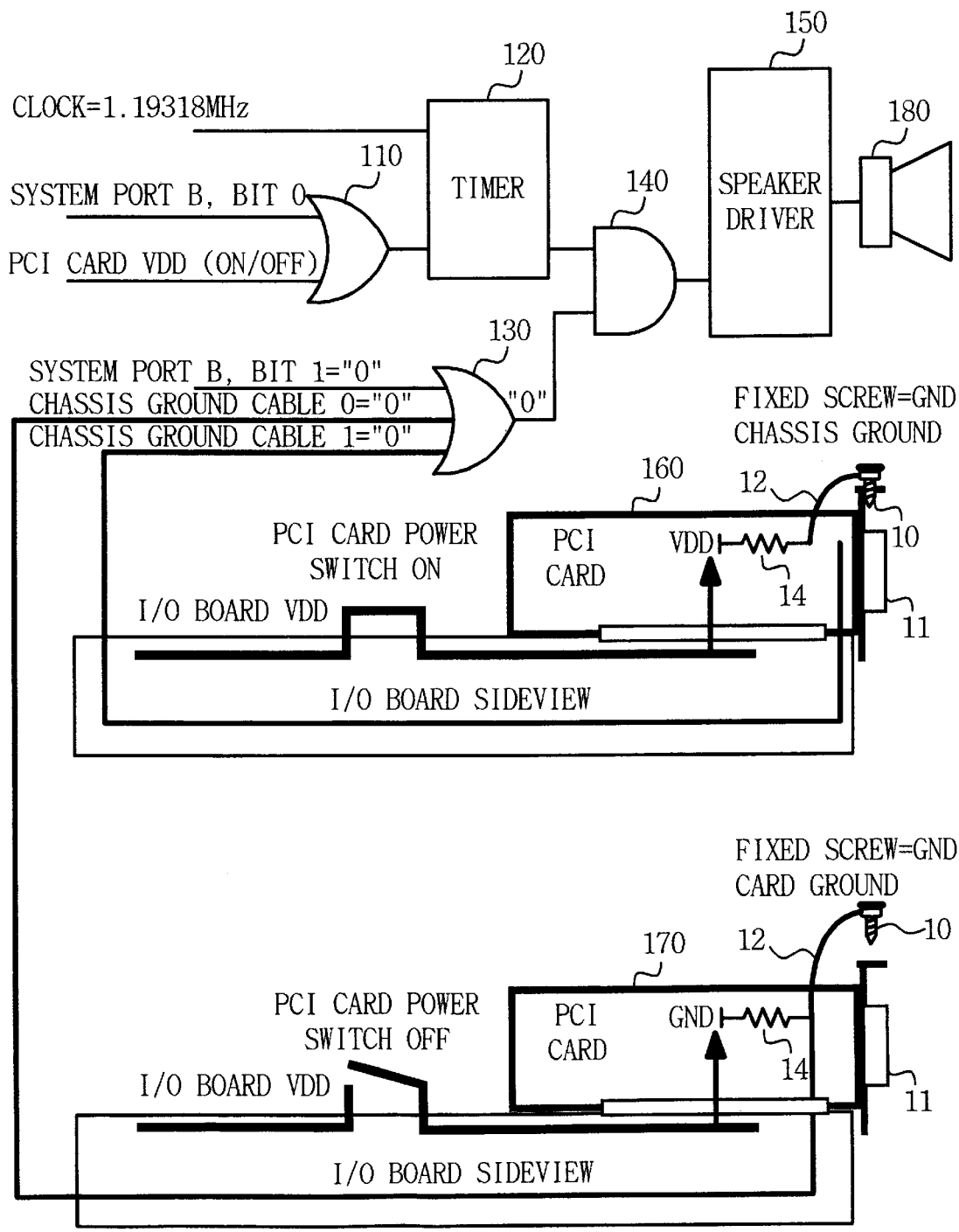
FIG. 2 shows the operation of the sound warning circuit, as connected to the system, using the card when a user does not make mistake.
Figure 3:
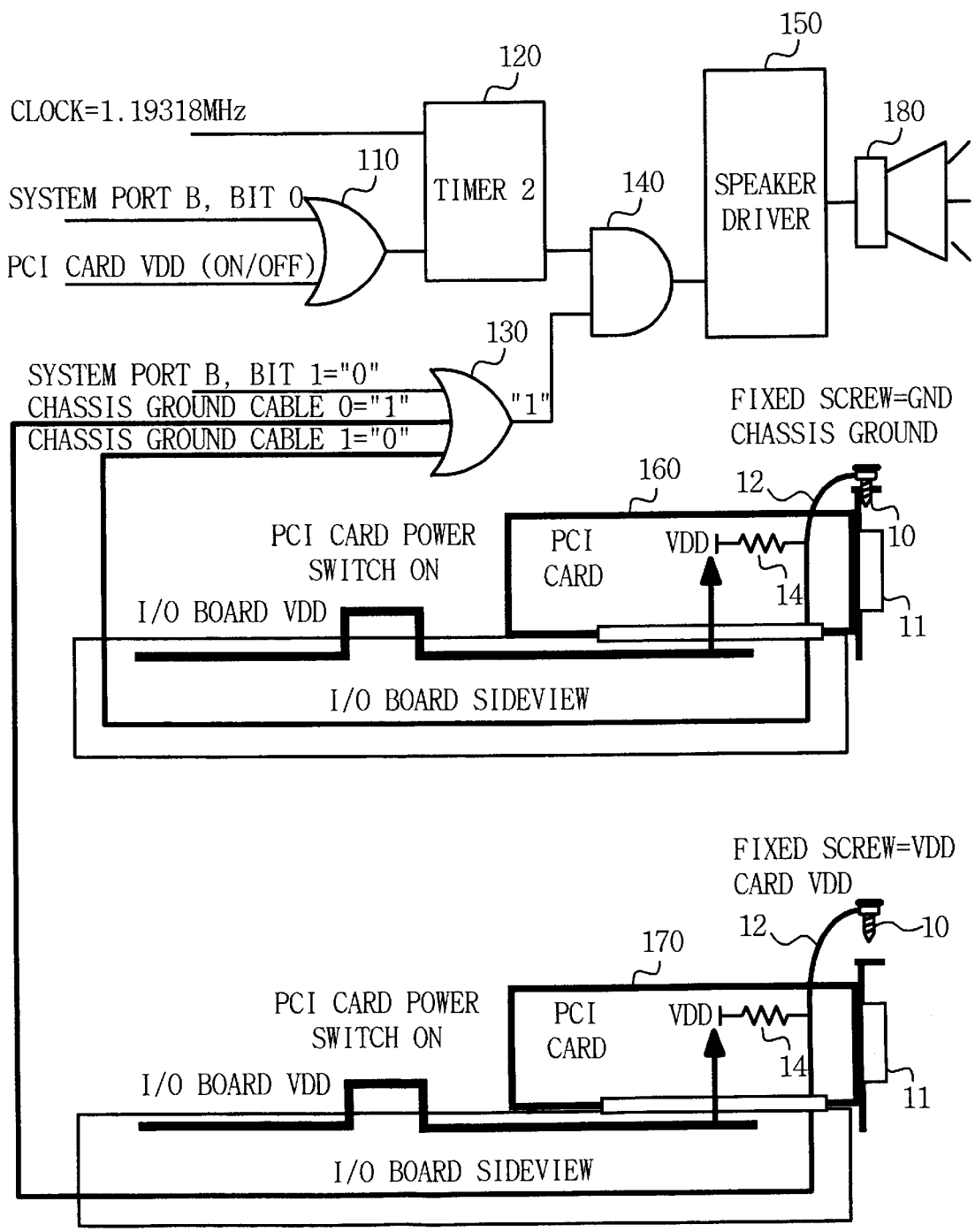
FIG. 3 shows the operation of the sound warning circuit, as connected to the system, using the card when a user makes a mistake.
Figure 4:
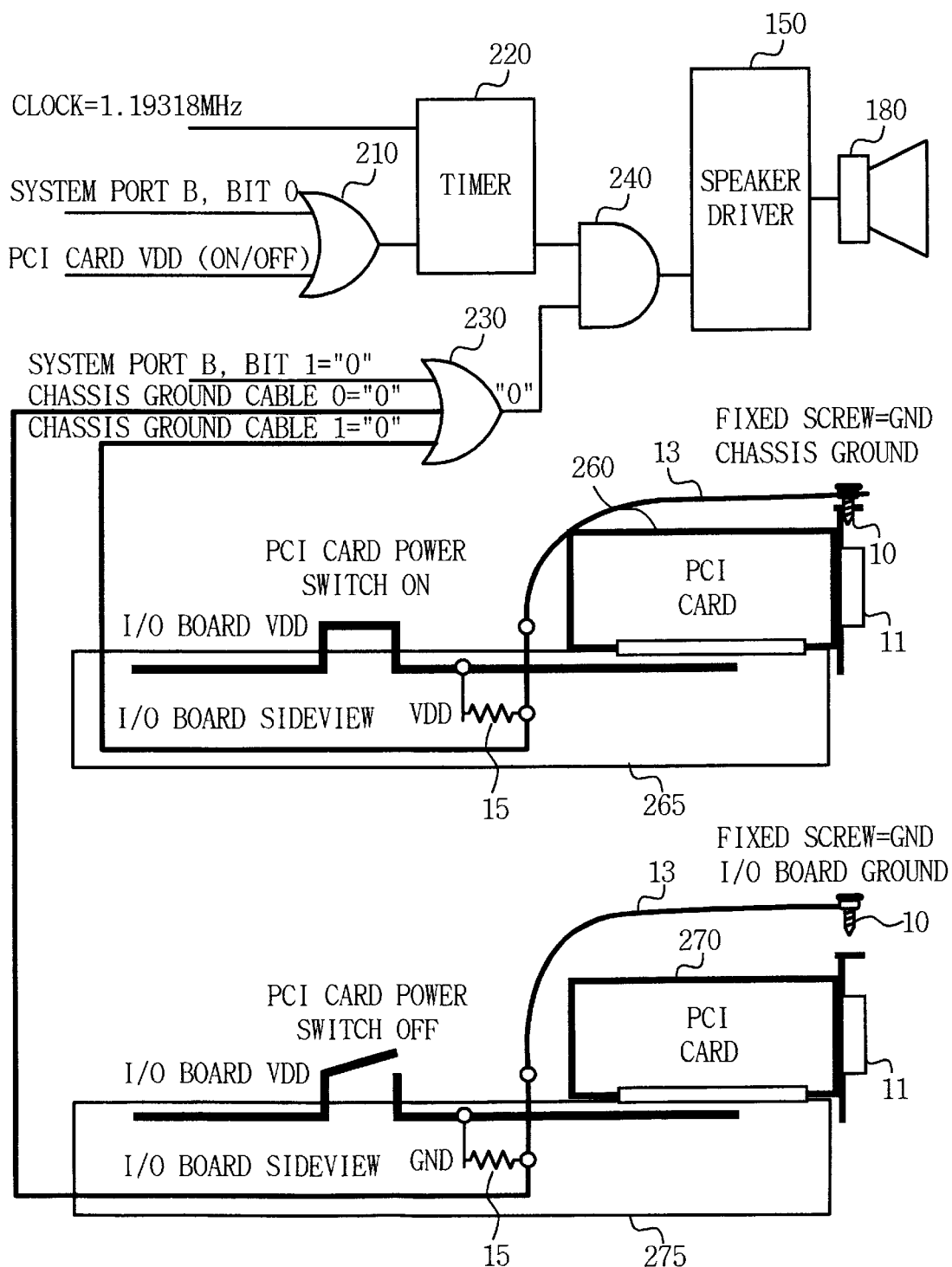
FIG. 4 shows the operation of the sound warning circuit, as connected directly to the system, when a user does not make a mistake.
Figure 5:
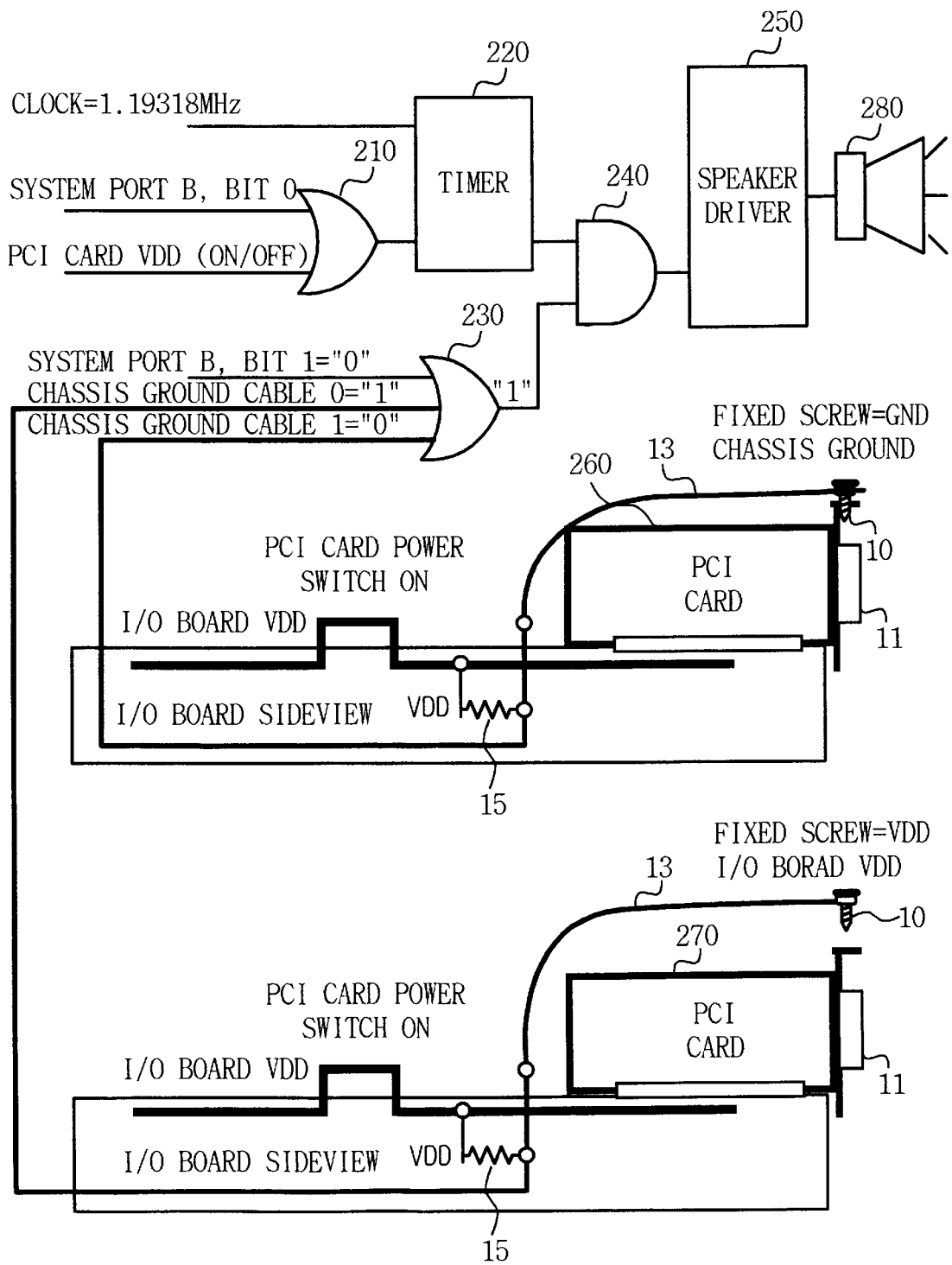
FIG. 5 shows the operation of the sound warning circuit, as connected directly to the system, when a user makes a mistake.

FIGS. 2 and 3 are diagrams of a first embodiment of the sound warning circuit as connected to a system using a PCI card, while FIGS. 4 and 5 are diagrams of a second embodiment of the sound warning circuit as connected to system using a PCI card. In FIGS. 2–5, a screw 10 fixes a wire 12, 13 to a grounded metal plate 11. The grounded metal plate 11 is used to secure the PCI card 160, 170, 260, 270 to the wire 12, 13 which is "pulled up" to logic level '1' and receives VDD from the input/output board through a 10 KΩ resistance 14. As soon as wire 12, 13, set to level T, is connected to screw 10 of the metal plate 11, which secures said PCI card, its logic level becomes '0' due to the chassis ground. If the screw 10 separates from the chassis, the wire 12, 13 will be in a "pull up" state and its logic level will return to '1'. Also, if a logic gate processes the adapter card's power state and the signal from the cable connected to said fixed screw 10, and its result causes the "power on" adapter card's metal plate screw 10 to disconnect, the speaker 180, 280 sounds a warning. Because the PCI hot plug is possible only when the power is off, the system sounds a warning if a "power on" adapter card is accessed. FIG. 2 illustrates the operation of the circuit when the user does not make a mistake, while FIG. 3 illustrates the operation of the system when the user makes a mistake.

As seen in FIGS. 2 and 3, the sound warning circuit includes a timer 120 having as inputs a clock input and the output of a logic OR gate 110. The logic OR gate 110 receives as inputs the system port B's bit 0 and a PCI card VDD input. The output of timer 120 is provided as one input to logic AND gate 140, the other input of which is connected to the output of logic OR gate 130. Logic OR gate 130 receives as inputs the system port B's bit 1 input, a chassis ground cable 0 input from the I/O board associated with PCI card 170, and a chassis ground cable 1 input from the I/O board associated with PCI card 160. Logic AND gate 140 provides its output to speaker driver 150, and driver 150 drives audio output device 180.

The chassis ground cable 0 is connected to the input/output board-speaker circuit, and connects through the PCI card 170, to a fixed screw comprising PCI card 170's reserved pin. The chassis ground cable 1 connects, through the PCI card 160, to the fixed screw which serves as the reserved pin of PCI card 160. The chassis ground cable 1 connected to the PCI card 160's fixed screw receives VDD from the input/output board because the PCI card's power is on, and its level drops to '0' because said fixed screw is connected to the metal plate, as grounded to secure the PCI card 160. However, because the chassis ground cable 0, connected to the unfixable PCI card 170's fixed screw, cannot receive the VDD from the input/output board when the power is off, its level remains '0', even if the fixed screw is disconnected from the metal plate. Therefore, unless the user sets the system port B's bit 1 to '0' to test the speaker's performance, the speaker driver 150 does not operate, and consequently the speaker does not operate. When there is no user mistake, the "power on" PCI card 160 does not run the speaker 180 because the screw is connected to the metal plate; the "power off" PCI card 170 cannot run the speaker 180 because the screw cannot receive the VDD from the input/output board.

FIG. 3 shows the operation of the sound warning circuit, connected to a system using a card when the user makes a mistake. The chassis ground cable 0, connected to the input/output board-speaker circuit, connects through the PCI card 170 to the fixed screw serving as a reserved pin. The chassis ground cable 1, in the same way, connects through the PCI card 160 to the fixed screw serving as a reserved pin. Since the chassis ground cable 1, connected to fixed PCI card 160's fixed screw, receives VDD from the input/output board when power is on, its level drops to '0' because the fixed screw is connected to the metal plate, as grounded to secure the PCI card 160. However, if the fixed screw is disconnected from the metal plate while the chassis ground cable 0, connected to the unfixable PCI card 170's fixed screw, is receiving the VDD from the input/output board because power is on, the cable level becomes '1' and it runs the speaker 180. If the user mistakenly separates the fixed screw from the metal plate when the PCI card's power is on, the speaker 180 warns the user that PCI hot plug is unprepared.

FIGS. 4 and 5 show a further embodiment of the sound warning circuit, as connected directly to the system. That is, the fixed screws associated with the PCI card are connected directly to the respective chassis ground cables (as opposed to the previous two embodiments of FIGS. 2 and 3, wherein the fixed screws associated with the PCI cards were connected through the respective PCI cards to the respective chassis ground cables).

Thus, referring to FIGS. 4 and 5, the arrangements shown therein are virtually identical to the arrangement of FIGS. 2 and 3, respectively, except for the previously described direct connection of the fixed screws associated with PCI cards 260 and 270 directly to the chassis ground cable 1 and chassis ground cable 0, respectively, the latter serving as inputs to the logic OR gate 230.

FIG. 4 shows the operation of the sound warning circuit, connected directly to the system, when the user does not make a mistake. The chassis ground cable 1, connected to the input/output board-speaker circuit, connects directly, through the input/output board 265, to the fixed screw serving as PCI card 260's reserved pin. The chassis ground cable 0, in the same way, connects directly, through the input/output board 275, to the fixed screw serving as PCI card 270's reserved pin. The chassis ground cable 1, connected to the secured PCI card 260's fixed screw, receives VDD from the input/output board when the power is on, and its level drops to '0' because the fixed screw is connected to the metal plate, grounded to secure the PCI card 260. However, because the chassis ground cable 0, connected to the unfixable PCI card 170's fixed screw, cannot receive the VDD from the input/output board when the power is off, its level remains at '0', even if the fixed screw disconnects from the metal plate. Therefore, unless the user sets the system port B's bit 1 to '1' to test the speaker's performance, the speaker driver 250 does not operate, and so the speaker 280 does not operate. When there is no user mistake, the "power on" PCI card 260 does not run the speaker 280 because the screw is connected to the metal plate; the "power off" PCI card 270 cannot run the speaker 280 because the screw cannot receive the VDD from the input/output board.

FIG. 5 shows the operation of the sound warning circuit, connected directly to the system, when a user makes a mistake. The chassis ground cable 0, connected to the input/output board-speaker circuit, connects through the input/output board to the fixed screw serving as a PCI card 270's reserved pin. The chassis ground cable 1, in the same way, connects through the input/output board to the fixed screw serving as PCI card 260's reserved pin. The chassis ground cable 1, connected to fixed PCI card 260's fixed screw, receives VDD from the input/output board because PCI card 260's power is on, and its level drops to '0' because the fixed screw is connected to the metal plate, grounded to secure the PCI card 260. If the fixed screw is disconnected from the metal plate while the chassis ground cable 0, connected to the unfixable PCI card 270's fixed screw, is receiving the VDD from the input/output board because the PCI card 270's power is on, the cable level becomes '1' and it runs the speaker 280. If the user mistakenly separates the fixed screw from the metal plate when the PCI card's power is on, the speaker 280 warns the user that the PCI hot plug is unprepared. Through setup, when the user disconnects the PCI card's fixed screw while the PCI card's power is on and a warning sounds, the user can reset the speaker using a reset switch, as now described.

Figure 6:
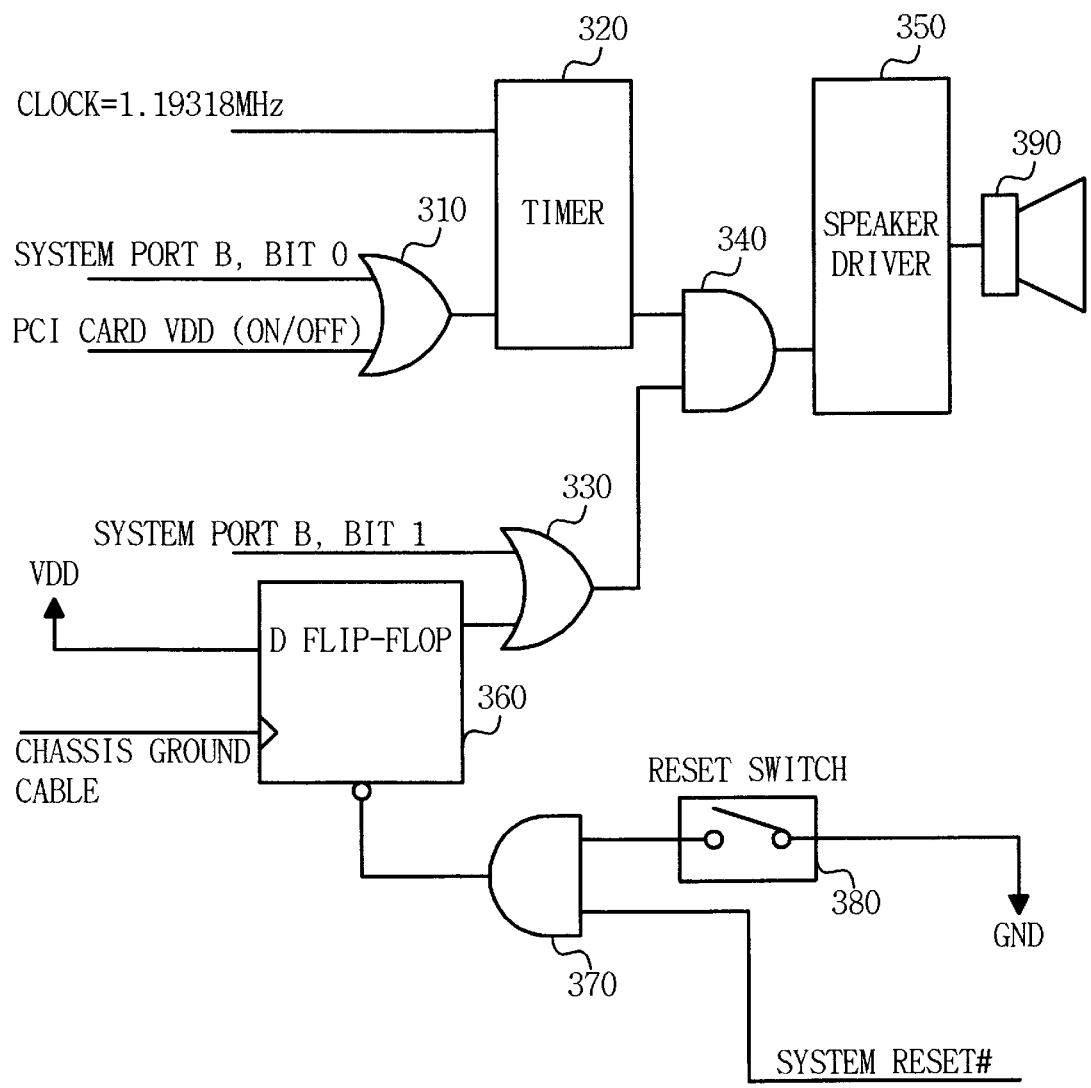
FIG. 6 is a schematic diagram of the sound warning circuit, according to the invention, and its reset switch.

FIG. 6 is a schematic diagram of a sound warning circuit, according to the invention, having a reset arrangement. The arrangement of FIG. 6 is similar to the previous arrangements of FIGS. 2–5. However, there are differences.

The circuit of FIG. 6 comprises: a logic AND gate 370 that takes as inputs the system reset # that is set to '0' during system reset or rerun, and the ground that goes through the reset switch 380; a D Flip-Flop 360 that takes as inputs VDD and said logic AND gate 370 output and makes the chassis ground cable the clock, the cable becoming '1' when each PCI card in the on state is separated from the system; a logic OR gate 310 that takes as inputs the system port B's bit 0 and said PCI card's VDD; a timer 320 that takes as an input a fixed frequency clock and divides it by said OR gate 310's output; a logic OR gate 330 that takes as inputs said D Flip-Flop 360's output and the system port B's bit 1; a logic AND gate 340 that takes as inputs said timer 320's output and said OR gate 330's output; a speaker driver 350 that takes as an input said AND gate 340 output; and a speaker 390 that runs based on said speaker driver 350.

Thus, logic OR gate 310, the output of which is provided as an input to timer 320, receives as inputs system port B's bit 0 and the PCI card VDD input. Timer 320 receives as inputs a clock input and the output of OR gate 310. The output of timer 320 is provided as an input to AND gate 340, the other input of which receives the output of OR gate 330.

OR gate 330 receives as inputs system port B's bit 1, as well as the output of a D-type Flip-Flop 360. The D Flip-Flop 360 receives a chassis ground cable input, as well as a reset input from a reset arrangement including AND gate 370 and reset switch 380. The operation of the arrangement of FIG. 6 is as follows.

Except for the situation in which the system port B's bit 0 and bit 1 equal '1', the speaker 390 operates when the timer 320's output is '1' and logic OR gate 330's output is '1'. Ignoring system port B, the logic OR gate 330 outputs a '1' when the chassis ground cable is set to a '1'. The chassis ground cable becomes a '1' when the user mistakenly separates the "power on" PCI card (described above in FIGS. 3 and 5). If the speaker 390 operates due to user mistake, the user turns on the reset switch 380. Then, because '0' is input to the logic AND gate 310, the D Flip-Flop 360 is cleared. Then, after passing through the Flip Flop 360, '0' is input to OR gate 330 after passing through the logic AND gate 340, and the speaker 390 is reset. The speaker 390 can be initialized by resetting the system, or by sending a system reset # signal '0' to AND gate 370 when the system power is on, or by making D Flip-Flop 360 use a '1' when the power is on. As mentioned above, the sound warning circuit can use the speaker 390 to warn about the PCI hot plug. However, the fixed output frequency buzzer can also be used for warning.

Figure 7:
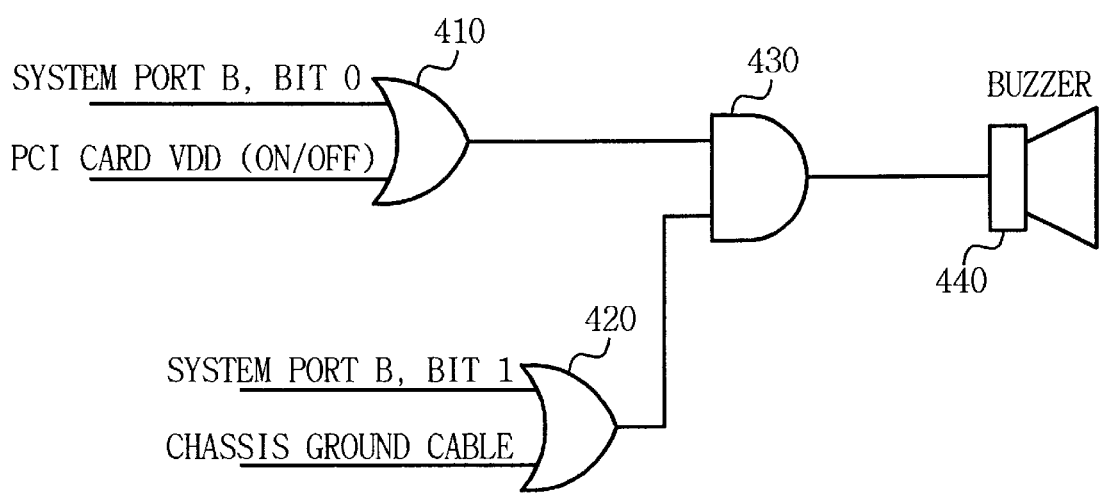
FIG. 7 is a schematic diagram of the sound warning circuit, according to the invention, used to drive a buzzer.

FIG. 7 is a schematic diagram of a sound warning circuit according to the invention as used to drive a buzzer. As seen in FIG. 7, a logic OR gate 410 receives the system port B's bit 0 and the PCI card VDD input. The output of OR gate 410 is provided as an input to AND gate 430, the other input of which receives the output of OR gate 420. OR gate 420 receives as inputs the system port B's bit 1 and the chassis ground cable input. The output of AND gate 430 is used to drive the buzzer 440. The operation of this arrangement will now be described.

The chassis ground cable is in the power-on state through the PCI card or through the direct connection to the fixed screw of the PCI card, and the cable level becomes '1' when the fixed screw is separated. When the system port B's bit 0 becomes a '1' or the PCI card VDD is on, the logic OR gate 410 outputs a '1'. When system port B's bit 1 become a '1' or chassis ground cable becomes a '1', the logic OR gate 420 outputs a '1'. When OR gates 410 and 420 both output a '1', AND gate 430 outputs a '1', a condition which causes the buzzer 440 to sound. Because the buzzer 440 has a fixed output frequency and a driver within the buzzer, a clock input and timer are not required, and a warning can be produced with setup alone. As mentioned above, a D Flip-Flop (such as Flip Flop 360 in FIG. 6) can be used to reset the buzzer after its operation or during system operation.

Figure 8:
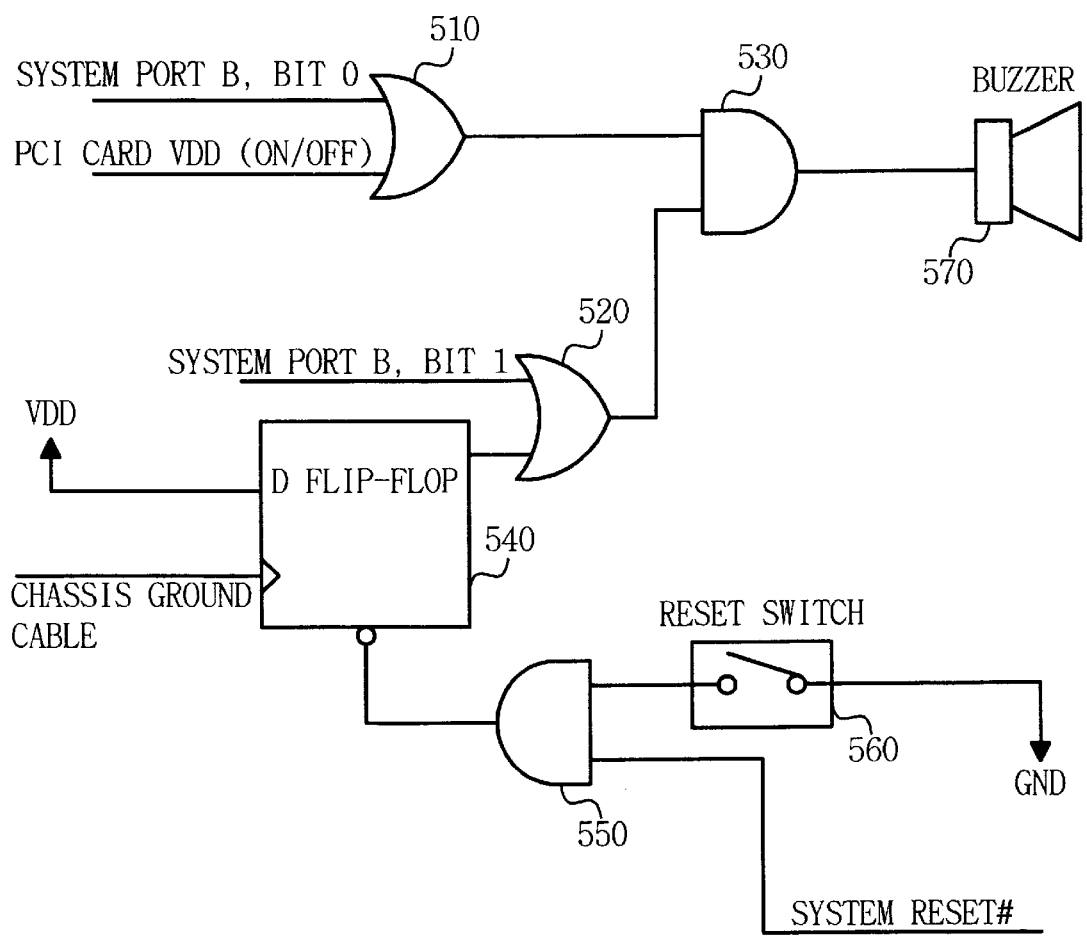
FIG. 8 is a schematic diagram of the sound warning circuit used with a reset switch and driving a buzzer.

FIG. 8 is a schematic diagram of a sound warning circuit which employs both a buzzer and a reset arrangement similar to that shown in FIG. 6. That is to say, gates 510, 520 and 530, as well as buzzer 570, correspond to the gates 410, 420 and 430, as well as buzzer 440, shown in FIG. 7. However, the chassis ground cable input to gate 420 in FIG. 7 is replaced, in FIG. 8, by the output of D Flip-Flop 540. The reset arrangement, including Flip-Flop 540, gate 550 and reset switch 560, as shown in FIG. 8, is virtually identical to the reset arrangement, including Flip-Flop 360, gate 370 and reset switch 380, shown in FIG. 6.

Thus, FIG. 8 shows a sound warning circuit for the PCI hot plug comprising: a log AND gate 550 that takes as inputs the system reset that is set to '0' during system reset or rerun, and the ground that goes through the reset switch 560; a D Flip-Flop 540 that takes as inputs VDD and said AND gate 550 output and makes said chassis ground cable the clock, and the cable inputs become '1' when each PCI card in on state is separated from the system; a logic OR gate 510 that takes as inputs the system port B's bit 0 and PCI card's VDD; a logic OR gate 520 that takes as inputs the system port B's bit 1 and D Flip-Flop 540 output; a logic AND gate 530 that takes as inputs said OR gate 510 and OR gate 520 outputs; and a buzzer 570 that sounds when said AND gate 530 output is '1'. Operation of the arrangement of FIG. 8 is as follows.

When a '0' enters the logic AND gate 550 due to the user's pressing the reset switch or system reset or system operation, a '1' enters D Flip-Flop 540's clear input and the D Flip-Flop 530 outputs a '0'. Then, the '0' passes through the logic OR gate 520 and the logic AND gate 530 sends a '0' to the buzzer 570, a condition which resets the buzzer 570.

The invention, when operated as described above, prevents the entire system from going down because of an access to an unprepared PCI card by warning, through a speaker or buzzer, that the PCI card is in power-on state and is not to be separated.

In the present invention, it is preferable that said chassis ground cable be connected to said PCI card's VDD; that said cable be connected to the fixed screw, a ground metal plate's reserved pin, used to fix said PCI card to the system; that said fixed screw, if connected to the PCI card's VDD, be always '0' if said PCI card's power is off, be '0' if said power is on and connected to the ground metal plate, and be '0' if separated from said ground metal plate; that said fixed screw be always '0' if said screw is connected to said PCI card's VDD and if said PCI card's power is off; that said chassis ground cable be connected to said fixed screw by going through the input/output board and said PCI card; and that said chassis ground cable be connected directly to said fixed screw by going through said input/output board.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A sound warning circuit for a PCI hot plug comprising:
    timer means responsive to a fixed frequency clock and a system port B's bit 0 for performing a timing operation and producing a timer output;
    a logic AND gate receiving the timer output and a system port B's bit 1, and producing an AND output;
    speaker drive means responsive to the AND output for producing a drive signal; and
    a speaker operating based on the speaker signal from said speaker driver means.

2. A sound warning circuit for a PCI hot plug, comprising:
    OR gate means for receiving a system port B's bit 0 and a PCI card VDD input, and producing an OR output;
    timer means responsive to a clock input and to said OR output for performing a timing operation;
    additional OR gate means for receiving a system port B's bit 1 and chassis ground cable inputs, and producing an additional OR output which has a value of logic one when a PCI card is in an "on" state and is separated from the system;
    AND gate means for receiving said timer output and said additional OR output, and producing an AND output;
    speaker driver means responsive to said AND output for producing a speaker driver output; and
    speaker means for producing sounds based on the speaker driver output.

3. A sound warning circuit as set forth in claim 2, wherein said chassis ground cable is connected to said PCI card VDD input and to a fixed screw comprising a ground metal plate reserved pin used to fix the PCI card to the system.

4. A sound warning circuit as set forth in claim 3, wherein said fixed screw is always '0' in value if said screw is connected to said PCI card VDD input, and if power to said PCI card is off; and
    wherein said screw is '0' if said power is on and said screw is connected to the ground metal plate, and said screw is '1' if said screw is separated from said ground metal plate.

5. A sound warning circuit as set forth in claim 3, wherein said chassis ground cable is connected to said fixed screw by going through the input/output board and said PCI card.

6. A sound warning circuit as set forth in claim 3, wherein to said chassis ground cable is connected to said fixed screw via said input/output board.

7. A sound warning circuit for a PCI hot plug, comprising:
    a logic AND gate for receiving a system reset # set to '0' during system reset and rerun, and for additionally receiving a reset switch input, said AND gate producing an AND output;
    a reset switch connected at its input to ground and producing said reset input at its output;
    a D Flip-Flop for receiving said AND output and a VDD input, said D Flip-Flop receiving a clock input comprising a chassis ground cable input, said chassis ground cable input being '1' in value when each of a plurality of PCI cards is in an "on" state and is separated from the system, said D Flip-Flop producing a D Flip-Flop output;
    a logic OR gate for receiving a system port B's bit 0 and said VDD input, and producing an OR output;

timer means for receiving a fixed frequency clock input and for dividing said fixed frequency clock input by said OR output, said timer means producing a timer output;

an additional logic OR gate for receiving said D Flip-Flop output and a system port B's bit 1, said additional OR gate producing an additional OR output;

an AND gate for receiving said timer output and said additional OR output, and producing an AND output;

speaker driver means for receiving said AND output and responsive thereto for producing a speaker driver output; and a speaker which is operational in accordance with said speaker drive output.

8. A sound warning circuit as set forth in claim 7, wherein said chassis ground cable is connected to said PCI card VDD input and to a fixed screw comprising a ground metal plate reserved pin used to fix the PCI card to the system.

9. A sound warning circuit as set forth in claim 8, wherein said fixed screw is always '0' in value if said screw is connected to said PCI card VDD input, and if power to said PCI card is off; and wherein said screw is '0' if said power is on and said screw is connected to the ground metal plate, and said screw is '1' if said screw is separated from said ground metal plate.

10. A sound warning circuit as set forth in claim 8, wherein said chassis ground cable is connected to said fixed screw by going through the input/output board and said PCI card.

11. A sound warning circuit as set forth in claim 8, wherein to said chassis ground cable is connected to said fixed screw via said input/output board.

12. A sound warning circuit for a PCI hot plug, comprising:

a first OR gate for receiving a system port B's bit 0 and a PCI card VDD input, and producing a first OR output;

a second OR gate for receiving a system port B's bit 1 and chassis ground cable input, said chassis ground cable input being '1' in value when a PCI card is in an "on" state and is separated from the system, said second OR gate producing a second OR output;

an AND gate for receiving said first and second OR outputs, and producing an AND output; and buzzer means for producing a sound when said AND gate output is logical '1' in value.

13. A sound warning circuit as set forth in claim 12, wherein said chassis ground cable is connected to said PCI card VDD input and to a fixed screw comprising a ground metal plate reserved pin used to fix the PCI card to the system.

14. A sound warning circuit as set forth in claim 13, wherein said fixed screw is always '0' in value if said screw is connected to said PCI card VDD input, and if power to said PCI card is off; and wherein said screw is '0' if said power is on and said screw is connected to the ground metal plate, and said screw is '1' if said screw is separated from said ground metal plate.

15. A sound warning circuit as set forth in claim 13, wherein said chassis ground cable is connected to said fixed screw by going through the input/output board and said PCI card.

16. A sound warning circuit as set forth in claim 13, wherein to said chassis ground cable is connected to said fixed screw via said input/output board.

17. A sound warning circuit for a PCI hot plug, comprising:

a first AND gate for receiving a system reset # that is set to logical '1' during one of system reset and rerun, and for receiving a reset input, said first AND gate producing a first AND output;

a D Flip-Flop for receiving a VDD input and said first AND output, and for also receiving a chassis ground cable input as a clock input thereto, said ground cables input being logical '1' in value when each of a plurality of PCI cards in an "on" state is separated from the system, said D Flip-Flop producing a Flip-Flop output, said D Flip-Flop producing a D Flip-Flop output;

a first OR gate for receiving a system port B's bit 0 and said VDD input, and producing a first OR output;

a second OR gate for receiving a system port B's bit 1 and said D Flip-Flop output, and producing a second OR output;

a second AND gate for receiving said first and second OR outputs, and producing a second AND output; and buzzer means for producing a sound when said second AND output is logical '1' in value.

18. A sound warning circuit as set forth in claim 17, wherein said chassis ground cable is connected to said PCI card VDD input and to a fixed screw comprising a ground metal plate reserved pin used to fix the PCI card to the system.

19. A sound warning circuit as set forth in claim 18, wherein said fixed screw is always '0' in value if said screw is connected to said PCI card VDD input, and if power to said PCI card is off; and wherein said screw is '0' if said power is on and said screw is connected to the ground metal plate, and said screw is '1' if said screw is separated from said ground metal plate.

20. A sound warning circuit as set forth in claim 18, wherein said chassis ground cable is connected to said fixed screw by going through the input/output board and said PCI card.

21. A sound warning circuit as set forth in claim 18, wherein to said chassis ground cable is connected to said fixed screw via said input/output board.

* * * * *